United States Patent
Makmel

(10) Patent No.: US 11,550,569 B2
(45) Date of Patent: Jan. 10, 2023

(54) DISCOVERING AND REMEDIATING HIDDEN SECRETS IN CODE FILES

(71) Applicant: CyberArk Software Ltd., Petach-Tikva (IL)

(72) Inventor: Gil Makmel, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 17/320,769

(22) Filed: May 14, 2021

(65) Prior Publication Data

US 2022/0365777 A1 Nov. 17, 2022

(51) Int. Cl.
*G06F 8/73* (2018.01)
*G06F 8/41* (2018.01)
*G06N 20/00* (2019.01)
*H04L 67/133* (2022.01)

(52) U.S. Cl.
CPC ........... *G06F 8/73* (2013.01); *G06F 8/433* (2013.01); *G06N 20/00* (2019.01); *H04L 67/133* (2022.05)

(58) Field of Classification Search
CPC ....... G06F 8/427–433; G06F 21/00–88; G06F 8/73; G06N 20/00; H04L 67/40
See application file for complete search history.

(56) References Cited

U.S. PATENT DOCUMENTS

| | | | |
|---|---|---|---|
| 7,392,545 B1 * | 6/2008 | Weber | G06F 21/577 713/188 |
| 8,365,291 B1 * | 1/2013 | Le | G06F 21/6263 726/25 |
| 9,336,381 B1 * | 5/2016 | Kane-Parry | G06F 21/577 |
| 10,607,015 B1 | 3/2020 | Hecht et al. | |

(Continued)

FOREIGN PATENT DOCUMENTS

| CN | 112 699 377 A | 4/2021 |
|---|---|---|
| EP | 3 660 714 A2 | 6/2020 |

OTHER PUBLICATIONS

Cheng et al., "Static Detection of Control-Flow-Related Vulnerabilities Using Graph Embedding", published by IEEE, 2019 24th International Conference on Engineering of Complex Computer Systems (ICECCS), pp. 41-50 (Year: 2019).*

(Continued)

*Primary Examiner* — S. Sough
*Assistant Examiner* — Zheng Wei
(74) *Attorney, Agent, or Firm* — Finnegan, Henderson, Farabow, Garrett & Dunner

(57) ABSTRACT

Disclosed embodiments relate to systems and methods for discovering and remediating hidden secrets in code files. Techniques include accessing an element of source code for analysis, performing a static analysis of the element of source code, and generating a control flow representation that identifies a plurality of functions and a sequence of functions associated with the element of the source code.

(Continued)

The techniques may further include determining a probability of a hidden secret being included in the element of source code and performing a security action of at least one of: generating an alert, displaying a visual indication of the probability, generating a report associated with the hidden secret, sending data associated with the probability to a machine learning system for training the machine learning system, or a remediating action associated with the hidden secret.

20 Claims, 5 Drawing Sheets

(56) References Cited

U.S. PATENT DOCUMENTS

| | | | | |
|---|---|---|---|---|
| 10,678,785 | B1* | 6/2020 | Anderson | G06F 16/2445 |
| 10,754,628 | B2* | 8/2020 | Hernan | G06F 8/73 |
| 10,817,604 | B1* | 10/2020 | Kimball | G06F 8/73 |
| 2006/0242077 | A1* | 10/2006 | Dettinger | G06F 21/12 705/59 |
| 2010/0083240 | A1* | 4/2010 | Siman | G06F 16/245 717/144 |
| 2012/0198417 | A1* | 8/2012 | Haviv | G06F 8/20 717/105 |
| 2016/0300065 | A1* | 10/2016 | Bang | G06F 21/577 |
| 2020/0349259 | A1* | 11/2020 | Tsai | G06F 21/562 |
| 2020/0394027 | A1* | 12/2020 | Ducore | G06F 8/427 |
| 2021/0075814 | A1* | 3/2021 | Bulut | G06N 3/08 |

OTHER PUBLICATIONS

Author unknow, "Micro Focus Fortify Static Code Analyzer User Guide", Software Version:20.1.2, published by Micro Focus, pp. 1-200 (Year: 2020).*
D'Souza et al., "Tool Evaluation report: Fortify", published by Analysis of Software Artifacts, 2007, pp. 1-10 (Year: 2007).*
Ajay YADAV, "Bypassing Obfuscation: Ciphered Code Reverse Engineering", https://www.c-sharpcorner.com/UploadFile/ajyaday123/bypassing-obfuscation-ciphered-code-reverse-engineering/, Dec. 3, 2020, 16 pgs.
Vadim Kotov et al., "Towards Generic Deobfuscation of Windows API Calls", Workshop on Binary Analysis Research (BAR) 2018, 11 pgs. https://www.ndss-symposium.org/wo-content/uploads/2018/07/58r2018_11_Kotov_paper_pdf.
Chris Wysopal et al, "Static Detection of Application Backdoors", Veracode, Inc., Burlington, MA USA, 7 pgs. https://www.veracode.com/sites/default/files/Resources/Whitepapers/static-detection-of-backdoors-1.0.pdt.
Regular Expression—Wikipedia, https://en.wikipedia.org/wiki/Regular_expression, May 12, 2021, 27 pgs.
Extended European Search Report, dated Sep. 30, 2022, issued by the European Patent Office in European Patent Application No. 22173507.9 (9 pages).

* cited by examiner

DISCOVERING AND REMEDIATING HIDDEN SECRETS IN CODE FILES

BACKGROUND

When writing computer software, software developers may write sensitive information and secrets directly into the source code, such as credentials, cryptographic keys, API keys, security certificates, and tokens. This sensitive data may be inadvertently committed to publicly available code repositories, such as GitHub™, GitLab™, or AWS™ Buckets. The availability of this sensitive information on publicly available repositories creates opportunities for a credential-based attack on the organization. Other risky development practices, like storing secrets in unsecured locations (e.g., unsecured code repositories or versioning systems), storing credentials in clear text, storing user passwords using weak or reversible encoding or encryption schemes, or using hard-coded credentials create vulnerabilities for an organization that can be exploited.

Some existing techniques for detecting embedded secrets utilize regular expressions (regex) to perform lexical searches against a variable name or API key pattern. However, these techniques require a database of search terms and may not detect secrets outside of the database of terms. Other detection methods include entropy checks, which detect unstructured secrets by measuring the entropy level of a string of code, and flagging strings with a high entropy score as a suspected secret. However, this technique may produce a high number of false positive detections that are not useful to a user.

Other existing techniques employ trained machine learning algorithms that improve the odds of accurately detecting secrets while minimizing false positives. While useful in refining the analysis, these algorithms require periodic user training and correction to function properly. However, a user may not want to employ dynamic analysis of code and may wish to rely solely on static analysis of code.

Accordingly, in view of these and other deficiencies in existing techniques, technological solutions are needed for inspecting source code files for the presence of hidden secrets. Such technological solutions should include improved static analysis of source code, such as identifying communication protocols, packages, function calls, file imports, or suspicious headers used in the source code. Furthermore, the analysis should be expanded beyond the source code to external files identified in the source code to discover hidden secrets. Technological solutions should advantageously improve detection of secrets by mapping a control flow representation that identifies the functions and sequence of the functions in the source code. Further, technological solutions should use the control flow representation to determine a probability or a risk assessment of a suspected location that holds a secret. Technological solutions should also involve a security action beyond mere detection of a hidden secret, such as notifying a user of the hidden secret or automatically remediating the secret through integration with secret management software.

SUMMARY

The disclosed embodiments describe non-transitory computer readable media, systems, and methods for inspecting source code files for the presence of hidden secrets. For example, in an embodiment, a non-transitory computer readable medium may include instructions that, when executed by at least one processor, cause the at least one processor to perform operations for inspecting source code files for the presence of hidden secrets. The operations may comprise accessing an element of source code for analysis; performing a static analysis of the element of source code; generating, based on the static analysis, a control flow representation of the element of source code, wherein the control flow representation identifies a plurality of functions and a sequence of the functions associated with the element of source code; determining, based on the control flow representation, a probability of a hidden secret being included in the element of source code; and performing, based on the probability, a security action comprising at least one of: generating an alert, displaying a visual indication of the probability, generating a report associated with the hidden secret, sending data associated with the probability to a machine learning system for training the machine learning system, or a remediating action associated with the hidden secret.

According to a disclosed embodiment, the static analysis may include at least one of identifying a communications protocol used by the element of source code, identifying a package used by the element of source code, identifying one or more function calls of the element of source code, identifying a file import associated with the element of source code, or identifying one or more headers of the element of source code as suspicious.

According to a disclosed embodiment, the probability of the hidden secret included in the element of source code may be based on an external file identified in the element of source code.

According to a disclosed embodiment, the probability of the hidden secret included in the element of source code may be based on the identification of an encryption or encoding algorithm in the element of source code.

According to a disclosed embodiment, the probability of the hidden secret being included in the element of source code may be specific to a particular location in the element of source code.

According to a disclosed embodiment, the control flow representation may indicate a flow of data according to the element of source code.

According to a disclosed embodiment, the control flow representation may indicate a plurality of application programming interface calls according to the element of source code.

According to a disclosed embodiment, the operations may further comprise providing feedback to the machine learning system based on the probability for acutely or progressively training the machine learning system.

According to a disclosed embodiment, the remediating action may include at least one of: sending an identification of the hidden secret to an external platform, rotating the hidden secret to a new value, deleting the hidden secret, logging the hidden secret, or invalidating the hidden secret.

According to a disclosed embodiment, the remediating action may include at least a partial integration with a security platform that manages secrets.

According to a disclosed embodiment, the operations may further include a verification of the hidden secret.

According to a disclosed embodiment, the probability may be based at least in part by on an output of the machine learning system.

According to a disclosed embodiment, the security action may be selected based at least in part on an output of the machine learning system.

According to another disclosed embodiment, there may be a computer-implemented method for inspecting source code files for the presence of hidden secrets. The method may comprise accessing an element of source code for analysis; performing a static analysis of the element of source code; generating, based on the static analysis, a control flow representation of the element of source code, wherein the control flow representation identifies a plurality of functions and a sequence of the functions associated with the element of source code; determining, based on the control flow representation, a probability of a hidden secret being included in the element of source code; and performing, based on the probability, a security action comprising at least one of: generating an alert, displaying a visual indication of the probability, generating a report associated with the hidden secret, sending data associated with the probability to a machine learning system for training the machine learning system, or a remediation action associated with the hidden secret.

According to a disclosed embodiment, accessing the element of source code for analysis may comprise receiving the element of source code from a code repository.

According to a disclosed embodiment, performing of the static analysis of the element of source code may be prioritized based on a preliminary analysis of the element of source code.

According to a disclosed embodiment, the preliminary analysis of the element of source code may include evaluation of nonexecutable programmer-readable language associated with the element of source code.

According to a disclosed embodiment, the preliminary analysis of the element of source code may include identifying a likelihood that the element of source code uses one or more secret.

According to a disclosed embodiment, the method may further comprise generating a risk assessment for the element of source code.

According to a disclosed embodiment, the risk assessment may be based on the probability and at least one of: an application or platform associated with the element of source code, whether the hidden secret is single-factor or multi-factor, a type of the hidden secret, or a sensitivity of a target resource at which the hidden secret may be used.

According to a disclosed embodiment, the security action may be selected based on the risk assessment.

According to a disclosed embodiment, the risk assessment may be associated with a risk score.

According to a disclosed embodiment, the remediating action may include at least one of: rotating the hidden secret to a new value, deleting the hidden secret, logging the hidden secret, or invalidating the hidden secret.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

Figure 1:
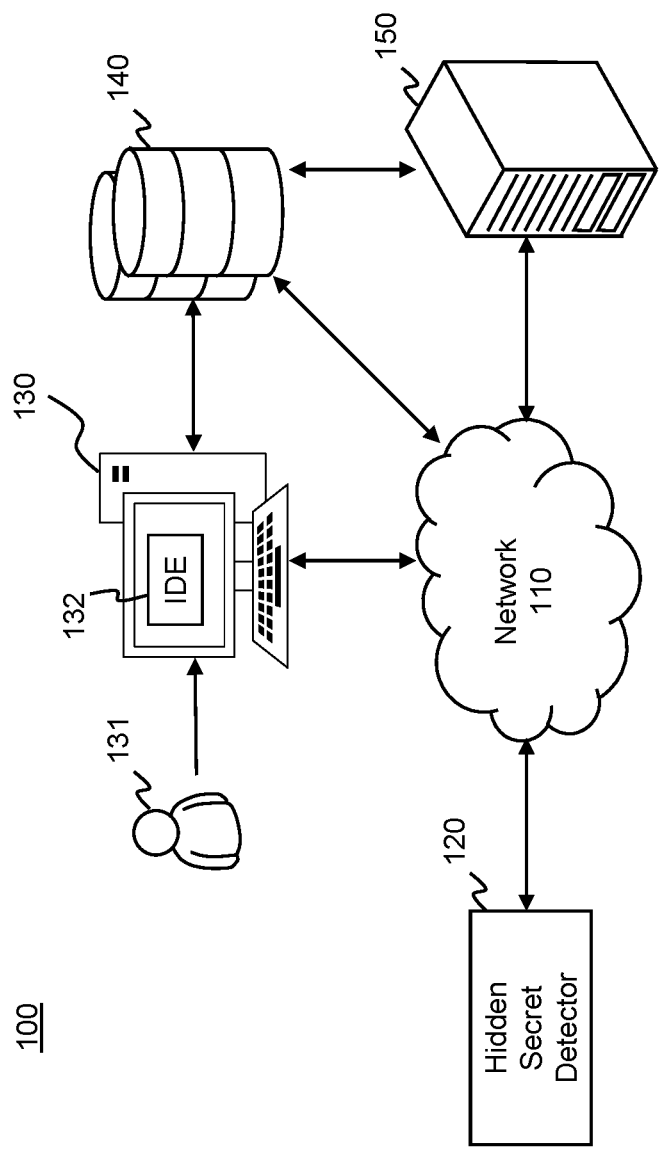
FIG. 1 is a block diagram of an exemplary system for detecting hidden secrets in code segments in accordance with disclosed embodiments.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for inspecting source code files for the presence of hidden secrets described herein overcome several technological problems relating to security, efficiency, and functionality in the fields of cybersecurity and code and software management. In particular, the disclosed embodiments provide techniques for determining a probability of a hidden secret being included in an element of the source code. As discussed above, sensitive information and secrets, such as security credentials, cryptographic keys, API keys, security certificates, and tokens are often placed in source code by developers, stored in unsecured locations, stored in clear text, stored using weak or reversible encryption, or the like. Often this source code is placed on publicly available code repositories (e.g., GitHub™), leaving organizations vulnerable to an attack using the hidden secret data. Furthermore, existing secret detection techniques require using regular expressions (regex) to perform lexical searches, conducting entropy checks which result in many false positive detections, or require use of dynamic analysis and live testing of the code to discover hidden secrets.

The disclosed embodiments provide technical solutions to these and other problems arising from current techniques. For example, disclosed techniques create efficiencies over current detection techniques by performing a preliminary classification to determine a probability that a file may use secrets. Such preliminary classification creates efficiencies in the detection process by reducing the total amount of code required to be analyzed. This improves both accuracy in secret detection and reduces the computer resources required to detect the hidden secrets. In addition, the disclosed techniques improve secret detection accuracy through mapping code logic using a control flow analysis, which allows the code to be analyzed in its execution order. Analysis of the control flow or a data flow analysis improves the accuracy in detecting hidden secrets because certain elements of the flow, represented in the control flow analysis, may have a higher probability of containing a hidden secret. Further disclosed techniques may involve analyzing files external to the source code to determine a probability that certain sections of the source code may contain a hidden secret. Other disclosed techniques include automatically remediating the hidden secret, or integrating reports of the hidden secret with a secret management program. This allows for seamless mitigation of vulnerable secret data in near real time, with secret detection and remediation being more accurate than a human can do alone. For these, and other reasons that will be apparent to those skilled in the art, the disclosed techniques provide improved security, performance, and efficiency over existing techniques.

Machine learning algorithms may be employed for the purposes of analyzing elements of source code, determining the probability of hidden secrets in source code, or performing security actions to mitigate security risks associated with the hidden secrets. Such algorithms may be trained using training examples or training data sets. Some non-limiting examples of such machine learning algorithms may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, techniques that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper-parameters, where the hyper-parameters may be set manually by a person or automatically by a process external to the machine learning algorithm (such as a hyper-parameter search algorithm), and the parameters of the machine learning algorithm may be set by the machine learning algorithm according to the training examples. In some implementations, the hyper-parameters may be set according to the training examples and the validation examples, and the parameters may be set according to the training examples and the selected hyper-parameters.

Further, the disclosed techniques may be automated using a trained machine learning algorithm. Such automation improves efficiency by eliminating or reducing the need for user input and increases accuracy and speed of code review beyond the capabilities of a human. Furthermore, while many current secret detection techniques are limited to alerting a user of the existence of a hidden secret, the disclosed techniques may provide solutions to remediating the hidden secret, thus quickly and efficiently eliminating a security risk to an organization without further review or manual action by a user.

Reference will now be made in detail to the disclosed embodiments, examples of which are illustrated in the accompanying drawings.

FIG. 1 illustrates an exemplary system 100 for inspecting source code files for the presence of hidden secrets, consistent with the disclosed embodiments. System 100 may represent an environment in which software code is developed and/or executed, for example in a cloud environment. System 100 may include one or more hidden secret detectors 120, one or more computing devices 130, one or more databases 140, and one or more servers 150, as shown in FIG. 1.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 131 may develop software code through an Integrated Development Environment (IDE) 132 operated on computing device 130.

System 100 may further comprise one or more database(s) 140, for storing and/or executing software. For example, database 140 may be configured to store software or code, such as code developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of slave databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure of services of Amazon Web Services™ (AWS), Microsoft Azure™, Google Cloud Platform™, Cisco Metapod™ Joyent™, vmWare™, or other cloud computing providers. Data sharing platform 140 may include other commercial file sharing services, such as Dropbox™, Google Docs™, or iCloud™. In some embodiments, data sharing platform 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the development process, for example, by managing communications between computing devices 130 and databases 140 over network 110. Server device 150 may identify updates to code in database 140, may receive updates when new or revised code is entered in database 140, and may participate in performing the detection techniques discussed below in FIGS. 4-5.

Hidden secret detector 120 may be any device, component, program, script, or the like, for inspecting source code files for the presence of hidden secrets within system 100, as described in more detail below. Hidden secret detector 120 may be configured to monitor other components within system 100, including computing device 130, Integrated Development Environment 132, database 140, and server 150. In some embodiments, hidden secret detector 120 may be implemented as a separate component within system 100, capable of analyzing software and computer codes or scripts within network 110. In other embodiments, hidden secret detector 120 may be a program or script and may be executed by another component of system 100 (e.g., integrated into computing device 130, database 140, or server 150).

Figure 2:
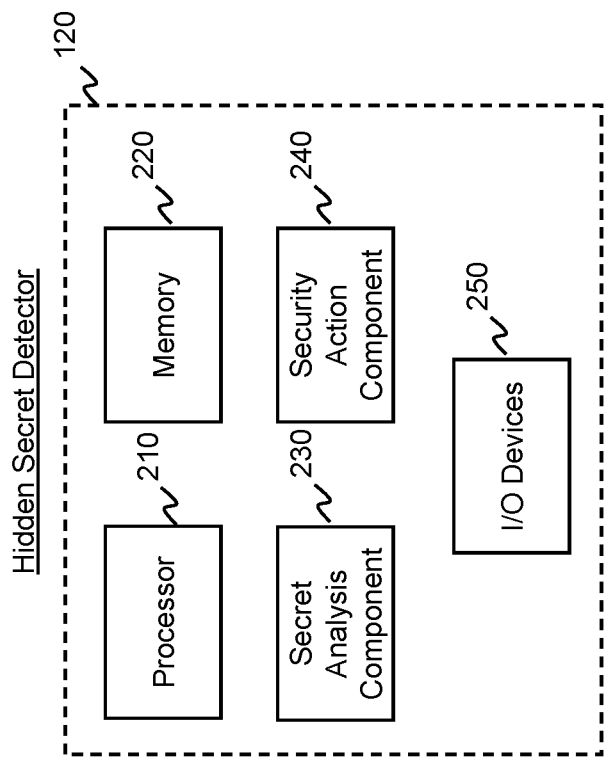
FIG. 2 is a block diagram showing an exemplary hidden secret detector in accordance with disclosed embodiments.

Hidden secret detector 120 may comprise additional elements to facilitate analysis of software, code, functions, and/or scripts within system 100. FIG. 2 is a block diagram showing an exemplary hidden secret detector 120 in accordance with disclosed embodiments. For example, hidden secret detector 120 may be a computing device and may include one or more dedicated processors 210 and/or memories 220. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMO®, Qualcomm®, Apple®, NVIDIA®, or the like. The processor 210 may also be based on the ARM architecture, a mobile processor, or a graphics processing unit, etc. In some embodiments, hidden secret detector 120 may be employed as a cloud service, such as a Software as a Service (SaaS) system, a Platform as a Service (PaaS), or Infrastructure as a Service (IaaS) system. For example, hidden secret detector 120 may be based on infrastructure of services of Amazon Web Services™ (AWS), Microsoft Azure™, Google Cloud Platform™, Cisco Metapod™, Joyent™, vmWare™, or other cloud computing providers. The disclosed embodiments are not limited to any type of processor configured in the computing device 130.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to securely obtain data from scanning device 130, for example, using methods 400 and 500, described in detail below. The disclosed embodiments are not limited to software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from the computing device 130. Furthermore, the memory 220 may include one or more storage devices configured to store data (e.g., machine learning data, training data, algorithms, etc.) for use by the programs, as discussed further below.

Hidden secret detector 120 may further comprise one or more components for performing various operations of the disclosed embodiments. For example, hidden secret detector 120 may contain a secret analysis component 230 and a security action component 240. Secret analysis component 230 may be configured to access or receive code or code segments from other components or devices within system 100. For example, secret analysis component 230 may be configured to access and inspect computing device 130, database 140, or server 150 for the presence of hidden secrets and to determine a probability of a hidden secret being included in the element of the source code as described further below. Security action component 240 may be configured to perform a security action based on the probability generated by secret analysis component 230, such as generating an alert, displaying a visual indication of the probability, generating a report associated with the hidden secret, sending data associated with the probability to a machine learning system, or performing a remediating action associated with the hidden secret, among other actions.

Secret analysis component 230 and security action component 240 may be separate components of hidden secret detector 120, for example, with dedicated processors and/or memories. In other embodiments, though shown separately in FIG. 2, secret analysis component 230 and security action component 240 may be integrated into memory 220 and/or processor 210. For example, secret analysis component 230 and/or security action component 240 may be software code, a script, or an application stored on memory 220 and/or executed by processor 210. Further, while hidden secret detector 120 is shown as having dedicated processor 210 and memory 220, hidden secret detector 120 itself may be integrated into various other components in system 100. For example, processor 210 and/or memory 220 may be the processor and memory devices of another component in system 100, for example on server 150, database 140, or computing device 130. In such embodiments, hidden secret detector 120 may be executed as software code, a script, or an application.

Hidden secret detector 120 may further include one or more input/output (I/O) devices 250. I/O devices 250 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, hidden secret detector 120 may use a network adaptor to scan for code and code segments within system 100. In some embodiments, the I/O devices 250 may also comprise a touchscreen configured to allow a user to interact with hidden secret detector 120 and/or an associated computing device. The I/O devices 250 may comprise a keyboard, mouse, trackball, touch pad, stylus, and the like. Like processor 210 and memory 220, in embodiments where hidden secret detector 120 is executed as software or code, I/O devices 250 may be associated with another component of system 100.

Figure 3:
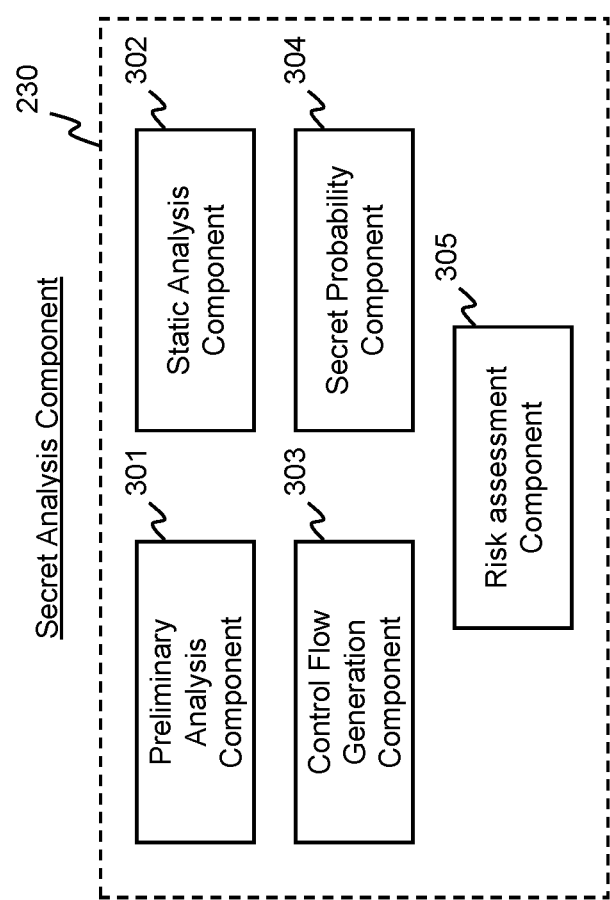
FIG. 3 is a block diagram showing an exemplary secret analysis component in accordance with disclosed embodiments.

FIG. 3 is a block diagram showing an exemplary secret analysis component 230 in accordance with disclosed embodiments. Secret analysis component 230 may comprise several other components or subcomponents 301, 302, 303, 304, and 305. As described above, secret analysis component 230 may be software code, a script, or an application stored on memory 220 and/or executed by processor 210. Accordingly, the various components or subcomponents of secret analysis component 230 may also be executed as software code, scripts, or applications. As shown in FIG. 3, secret analysis component 230 may comprise a preliminary analysis component 301, a static analysis component 302, a control flow generation component 303, a secret probability component 304, and a risk assessment component 305.

Each of these subcomponents may be configured to analyze code or associated files received by the secret analysis component 230 to detect the presence of hidden secrets. For example, preliminary analysis component 301 may determine the probability that a file contains hidden secrets by scanning a file external to the received source code, for example, a configuration file, an external text file, a JSON file, an XML file, or the like. The preliminary analysis component 301 may then send priority data to the static analysis component 302 based on the preliminary analysis. Static analysis component 302 may perform a static analysis of the element of source code to detect hidden secrets. Such static analysis may include identifying communication protocols, identifying packages, identifying calls such as API calls or internal resource calls, identifying file imports, or identifying suspected headers.

Control flow generation component 303 may be configured to map code logic to expose hidden secrets. Mapping code logic may include generating a control flow analysis, generating a control flow graph of the program, or generating a data flow analysis of the program. The results of such control flow analysis may be stored, for example, in a graph database (GDB). Secret probability component 304 may receive data from preliminary analysis component 301, static analysis component 302, and control flow generation component 303 to determine a probability that an element of code holds a secret or confidential data. Secret probability component 304 may flag suspected code patterns, suspected resources, suspected providers, or suspected file names; flag correlated files; or flag instances of string obfuscation in determining the probability. Risk assessment component 305 may be configured to generate a risk assessment, based on the inspection of the code subcomponents, that indicates the probability that a specific code location holds a secret. Risk assessment component 305 may additionally calculate the risk score based on factors that be based on the code application or program, whether the code uses single or multi-factor security, based on secret type such as password, token, or access key, or based on the sensitivity of the target source. Secret analysis component 230 may perform these functions in accordance with process 400 and process 500 discussed in further detail herein.

Referring to FIG. 2, security action component 240 may be configured to perform a security action on an element of source code based on the probability of a hidden secret being included in the element of source code as determined by secret analysis component 230. Such security actions may include generating an alert, displaying a visual indication of the probability, generating a report associated with the hidden secret, performing a remediating action associated with the hidden secret, or sending data associated with the probability to a machine learning system for training the machine learning system as disclosed in further detail in process 400 and process 500 herein.

Figure 4:
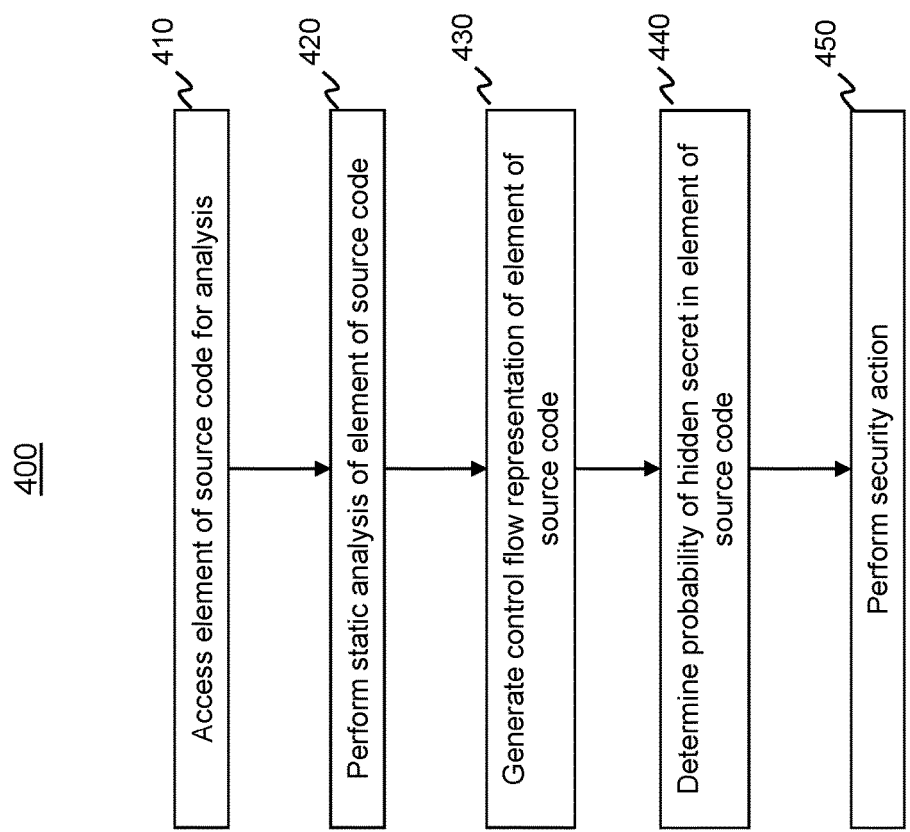
FIG. 4 is a flowchart depicting an exemplary process for detecting hidden secrets in code segments.

FIG. 4 is a block diagram depicting an exemplary process 400 for inspecting source code files for the presence of hidden secrets. Process 400 may be performed, for example, by hidden secret detector 120, or processor 210. At step 410, process 400 may include accessing an element of source code for analysis. An element of source code may be any form of computer-based code, including software, mobile applications, scripts, web applications, "instant" apps, server-side applications, APIs, embedded code (e.g., in an IoT device, Raspberry Pi, Arduino, etc.), serverless code instances, or any other form of code. Source code may also be written in any suitable programming language, including but not limited to Java, Python, C, Ruby, JavaScript, C#, .NET, PHP, Objective-C, SQL, Go, C++, or various other programming languages. An element of source code may also implement one or more API actions, for example, based on AWS™ (e.g., Amazon S3™, Amazon EC2™, Amazon Elastic Beanstalk™, AWS PowerShell™, etc.), Google™ (e.g., Google APIs™, Google Analytics™, Youtube™, Ad Exchange™, Google Maps,™ etc.), social media (Twitter™, Facebook™, Linkedin™, Pinterest™, Tumblr™, Instagram™, etc.), or various other APIs. An element of source code may contain functions which, when executed, cause actions to be performed on applications and/or data within the environment in which it is installed. For example, an element of source code may be installed on one or more devices within system 100 (such as computing device 130, database 140, and/or server 150) and may cause various actions to be performed within system 110. An element of source code may call actions for performing actions on other code segments and on the external environment, which may include accessing, modifying, downloading, moving, deleting, or otherwise manipulating target data, files, applications, code segments, or other target resources in system 100.

In some embodiments, an element of source code may be accessed from a repository for source code data, such as GitHub™, GitLab™, Bitbucket™, or other source control management vendors. In other embodiments, an element source code may be accessed within system 100, such as from database 140, and/or server 150 or any other internal repository. In further embodiments, an element of source code may be accessed through a user device, such as an external hard drive, USB memory device, or any other data storage device. An element of source code is not limited to computer-based code alone but may also include external files associated with the source code, such as configuration files, read-me files, JSON files, XML files, external text files, or any other form of external file.

At step 420, a static analysis of the element of source code may be performed, for example, by static analysis component 302. A static analysis of an element of the source code may include identifying a communications protocol used by the element of source code, identifying a package used by the element of source code, identifying one or more function calls of the element of source code, identifying a file import associated with the element of source code, identifying one or more headers of the element of source code as suspicious, or identifying an encryption or encoding algorithm. For example, the static analysis may include performing a lexical search for headers in code segment containing the term "authorization" or "password" or a similar term indicating the presence of hidden data. Such a review of the header data facilitates the detection of hidden secrets over the prior art, which may rely on searching for specific credential keys or tokens themselves. In another example, the static analysis may detect copy-pasted strings or identify and produce the entire copy-paste history of the element of source code. This history may further indicate the presence of hidden secrets inadvertently inserted into the source code through importing the code from another source.

At step 430, process 400 may include generating a control flow representation of an element of source code, and may be performed for example, by control flow generation component 303. The control flow representation may identify all functions and a sequence of functions included in the source code. Generating a control flow representation may include generating a control flow graph of the program, or an API call graph of the program. Other control flow representations may include a flow of data according to the element of source code, or a data flow analysis, which may depict the way data is exchanged inside the program as well as interactions with external data providers. In some embodiments, the control flow representation may include a table listing a sequence of functions or steps in the source code or may identify a repository associated with the source code. In other embodiments, the control flow representation indicates a plurality of application programming interface calls according to the element of source code. The control flow analysis may facilitate detection of hidden secrets by identifying and mapping the full lifecycle of the secret in the source code. For example, the control flow representation may reveal certain code patterns, identify resources or providers, reveal suspicious file names (token.txt, login.txt), or reveal instances of string obfuscation, that indicate the presence of hidden secrets. By mapping the control flow, the identification and sequence of these functions may be revealed and correlations between the functions and the sequence of functions with the presence of hidden secrets may be determined.

At step 440, process 400 may include determining a probability of a hidden secret in an element of the source code, and may be performed, for example, by security probability component 304. The probability of a hidden secret in an element of the source code may indicate the likelihood that a credential, API key, security certificate, or other secret is present in the source code or an associated external file. The probability may be based on a preliminary classification of the source code through analysis of external files associated with the element of source code, the static analysis of the element of source code, or the control flow analysis performed on the source code. For example, the static analysis and the control flow representation may reveal certain code patterns, identify resources or providers, reveal suspicious file names (token.txt, login.txt), or reveal instances of string obfuscation, that indicate the presence of hidden secrets. The probability that these instances contain a valid secret or other hidden data may be determined through a predetermined set of rules, analysis of historical data, or through user experience. For example, searches for the term "token" are likely to return tokenized credentials, and searches for the header "authorization" are likely to reveal code segments containing authorization data. Probabilities of hidden secrets may also be determined through reading environment variables that represent the state of the system environment upon the start of the application, through searching for credential terms in XML data, or through searches of key generation based on a static seed. These instances may be flagged as suspicious and assigned a probability that the code segment contains a valid secret or other hidden data.

In some embodiments, the probability of the hidden secret included in the element of source code is based on an external file identified in the element of source code. For example, the source code may identify correlated files containing suspicious file markers, such as file names or headers indicating hidden secret data like "token" or "password" and the like, that indicate the presence of a hidden secret. Determining the probability may include analyzing the external file or mapping the external file with the control flow representation of the element of source code.

In other embodiments, the probability of the hidden secret included in the element of source code may be based on the identification of an encryption or encoding algorithm in the element of source code. Files containing sensitive data or other hidden secrets are often encrypted to secure the information. For example, e-commerce or banking data, user access data, or password data may be secured using one or more available encryption techniques, such as Triple DES, RSA, Blowfish, or a privileged access security system such as CyberArk's Vault™. By identifying the encryption techniques used in the element of source code, the probability may be adjusted to reflect the likelihood of hidden secrets contained in such secured locations.

In other embodiments, the probability of the hidden secret being included in the element of source code is specific to a particular location in the element of source code. For example, disclosed techniques may isolate a portion of the element of source code and flag it as suspicious or likely to contain a hidden secret. The particular location in the element of the source code may be identified through the static analysis of step 420 or the control flow representation of step 430. In other embodiments, the probability of the hidden secret being included in the element of source code is based on a plurality of locations in the element of source code. In further embodiments, the probability of the hidden secret being included in the element of source code may be based at least in part on a trained machine learning algorithm of the type disclosed herein.

At step 450, process 400 may include performing a security action, performed for example, by security action component 240. A security action may be any function that logs, alerts, reports, disables, stores, mitigates, deletes, remediates, or otherwise invalidates the hidden secret. In some embodiments, performing a security action includes displaying a visual indication of the probability. The visual indication may be displayed through a graphic user interface to a user and may include text displaying a probability in the form of a percentage, may be displayed in the form of a graph or table, or any other visual indication suitable for indicating a probability to a user. In some embodiments, the visual indication may be linked with a particular location in an element of the source code. For example, the visual indication may be displayed as colors, with certain colors representing a higher probability that the element of source code containing a hidden secret, and other colors representing lower probability that the element of source code contains a hidden secret. Such colors may be overlayed or displayed in conjunction with a visual representation of the source code, creating a heat map indicating certain sections of the source code having high or low probabilities of containing a hidden secret.

In some embodiments, performing the security action may include generating an alert. The alert may be any visual, audio, or haptic feedback that notifies a user of the hidden secret. For example, the alert may be displayed via text or graphics on a computer or other user device. Other examples include alarms, audio pings, or other audio feedback indicating the probability.

In other embodiments, performing the security action may include generating a report associated with the hidden secret. The report may be a text-based report or a visual indicator of a hidden secret such as a pop-up display or user prompt. The report may include audio alerts or warnings indicating the presence of a hidden secret. In one example, the report provides the probability. However, the report is not limited to the probability alone and may include other information, such as a list of repositories or files containing hidden secrets, or a list of suspect code locations, suspected file origins or providers, or any other data associated with the hidden secret or the probability.

In other embodiments, the security action may include sending data associated with the probability to a machine learning system for training the machine learning system. Such training data may include input data or output data for training machine learning models of the types disclosed herein.

In yet other embodiments, the security action may comprise a remediating action associated with the hidden secret. A remediation action is any action that identifies, logs, exposes, notifies, or otherwise mitigates the risk of the hidden secret in the element of source code. In some embodiments, the remediating action is automatic and does not include an alert, a report, or otherwise require input form the user. In some embodiments, the remediating action includes sending an identification of the hidden secret to an external platform (e.g., server 150). The external platform may be an external tool for managing and securing secrets. In other embodiments, the remediating action includes at least a partial integration with a security platform that manages secrets. The partial integration may allow a user to use the disclosed techniques in a common user interface with the secret management software and seamlessly manage or remediate hidden secret data between the systems. Suitable security platforms may include, for example, CyberArk's Conjur™ secret management software.

The remediation action may include modifying the hidden secret to remove or reduce the security risk imposed by the hidden secret. For example, the remediating action may include rotating the hidden secret to a new value, deleting the hidden secret, or otherwise invalidating the hidden secret. In other embodiments, it may be undesirable to modify the hidden secret due to the risk of causing errors in the element of source code, or due to security concerns related to the hidden secret. In these situations, the remediating action may include logging the hidden secret without modifying the hidden secret or the source code.

The security action may be based on the probability of a hidden secret being included in the element of source code. The system may elect to perform one or more security action techniques of the type disclosed herein, or may elect not to perform a security action, based on certain threshold probabilities. For example, if the probability is relatively low, the security action may include passive reporting or alert-based security action. If the probability is high, or if the source code is particularly sensitive to the user, the security action may include more aggressive actions such as deleting the hidden secret or performing other remediation actions. In other embodiments the system may elect not to perform a security action, for example, when the probability is very low. Such probability thresholds can be configured by the user or by a third party.

In some embodiments, the operations further comprise providing feedback to the machine learning system based on the probability for acutely or progressively training the machine learning system. In other embodiments, the security action is selected based at least in part on an output of the machine learning system. For example, a machine learning algorithm may be trained to recognize an appropriate security action response based on the probability, based on a risk assessment, or based on certain characteristics of the element of the source code.

In some embodiments, the operations may further include a verification of the hidden secret. For example, the control flow representation may indicate that the hidden secret is a live variable used in the element of source code. Such indication confirms that the suspected hidden secret is a genuine hidden secret used in the execution of the source code. Other verification techniques may include verification by the end user. For example, such user may respond to an alert or notification regarding a hidden secret with the provision of information about the identified secret. Such verification of the identified secret may be used to further train the machine learning algorithms.

Figure 5:
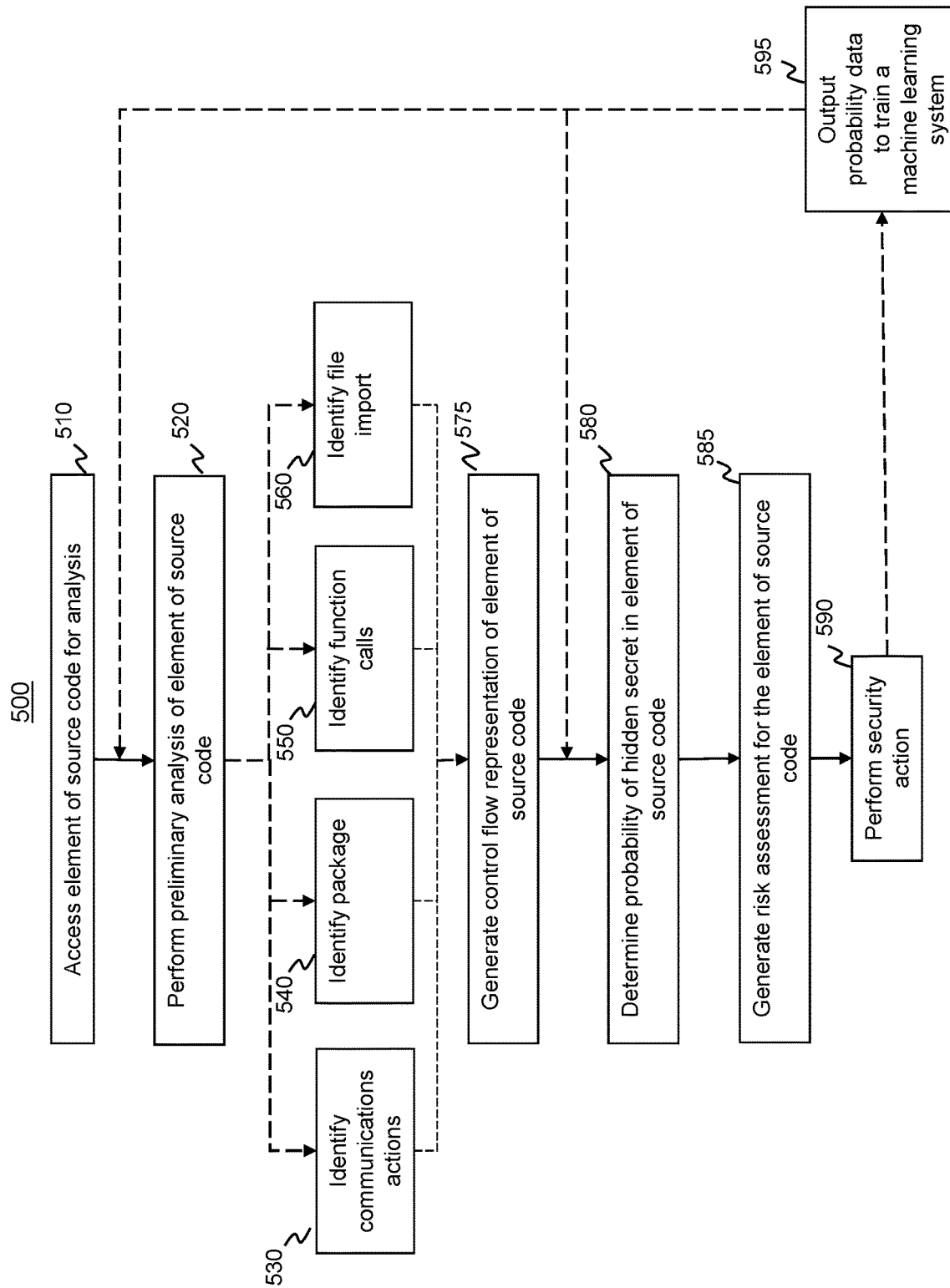
FIG. 5 is a flowchart depicting an exemplary process for detecting hidden secrets in code segments incorporating a risk assessment and machine learning into the detection.

FIG. 5 is a block diagram depicting an exemplary process 500 for inspecting source code files for the presence of hidden secrets in accordance with disclosed embodiments. Process 500 may be performed, for example, by hidden secret detector 120, or processor 210. Process 500 may correspond to process 400 depicted as a block diagram in FIG. 4. Accordingly, the descriptions and methods described above with respect to process 400 may equally apply to process 500.

At step 510, process 500 may include accessing an element of source code for analysis. An element of source code may be any form of computer-based code as described above. The element of source code may be installed on one or more devices within system 100 (such as computing device 130, database 140, and/or server 150) and may cause various actions to be performed within system 110. In some embodiments, the element of source code may be accessed from a repository for source code data, through a user device, such as an external hard drive, USB memory device, or any other data storage device. An element of source code is not limited to computer-based code alone but may also include external files associated with the source code, such as configuration files, read-me files, JSON files, XML files, external text files, or any other form of external file.

At step 520, process 500 may include performing a preliminary analysis of the element of source code. In some embodiments, the preliminary analysis of source code may include an evaluation of nonexecutable program-readable language associated with the element of source code. For example, lexical searches or string-matching searches may be performed using certain keywords to analyze comments contained in source code to determine if hidden secret data is present in the code. In other embodiments, the preliminary analysis may include an evaluation of external files associated with the source code. For example, readme files, EULA files, configuration files, notes, or comments may be analyzed to indicate whether certain sections of the source code may contain hidden secrets. The preliminary analysis may include flagging repositories of code, or other sources of code, as suspicious or as safe.

A preliminary analysis of the element of source code may be used to prioritize the static analysis of source code. For example, the preliminary analysis may indicate certain locations in the element of source code have a higher likelihood of containing a hidden secret. In this situation, the static analysis may be performed on the prioritized section of source code. Alternatively, the static analysis techniques may be refined or selected based on the preliminary analysis, as shown, for example, in step 530, 540, 550, and 560 of process 500 in FIG. 5.

As an illustrative example, a readme file associated with an element of code may be analyzed as part of the preliminary analysis. The readme file may indicate the context of the entire repository, for example, by stating that the source code involves the AWS™ environment. The static analysis may then be prioritized and refined by performing lexical searches for hidden secrets commonly associated with the AWS™ environment, such as "connecting" or "password." The preliminary analysis is not limited to deriving context from a search of readme files and may include any evaluation of nonexecutable program-readable language associated with the element of source code.

In some embodiments, the preliminary analysis of the element of source code may include identifying a likelihood that the element of source code uses one or more secrets. This likelihood may be used to refine the static analysis of the element of source code. Alternatively or additionally, step 580, determining the probability of a hidden secret, may be based at least in part on the likelihood determined in the preliminary analysis.

Collectively, steps 530, 540, 550, and 560 of process 500 may correspond to step 420 of process 400. However as stated above, the static analysis technique may be selected, refined, or prioritized based on the preliminary analysis of the element of source code in step 520. At step 530, communications actions used by the element of source code may be identified. At step 540, a package used by the element of source code may be identified, and at step 550, one or more function calls of the element of source code may be identified. At step 560, a file import associated with the element of source code may be identified. Steps 530, 540, 550, and 560 may occur simultaneously, sequentially, or iteratively. Steps 530, 540, 550, and 560 may be performed in part or in full, and one or more of these steps may be selected or omitted from process 500 as a result of the preliminary analysis 520, at the configuration of the user, or at the configuration of a third party.

At step 575, process 500 may include generating a control flow representation of the element of source code. Step 575 of process 500 may correspond to step 430 of process 400 disclosed above. At step 580, process 500 may include determining a probability of a hidden secret in an element of the source code. Step 580 may correspond to step 440 of process 400 disclosed above.

At step 585, process 500 may include generating a risk assessment for the element of source code. The risk assessment may comprise a risk score indicating the level of security risk posed by hidden secrets in the element of source code. The risk assessment is not limited to a numerical score and may include various visual representations such as traffic lights, gauges, dials, pictures of hand signals, stop signs, or other suitable graphical displays indicating a warning or level of risk.

In some embodiments, the risk assessment is based on the probability determined in step 580 and one or more other factors. Such other factors may include an application or platform associated with the element of source code, whether the hidden secret is single-factor or multi-factor, a type of the hidden secret, or a sensitivity of a target resource at which the hidden secret may be used. The risk assessment may be based on or associated with the risk score. For example, if the target resource is particularly valuable to the user, such as containing confidential financial data or highly confidential information, the risk assessment may be higher compared to a target resource with little data sensitivity or value.

At step 590, process 500 may include performing a security action. Step 590 may correspond to step 450 in process 400. In some embodiments, the security action is selected based on the risk assessment determined in step 585. The system may elect to perform one or more security action techniques of the type disclosed herein, or may elect not to perform a security action, based on certain threshold risk assessments. For example, if the risk assessment is relatively low, the security action may include passive reporting or alert-based security action. If the risk assessment is high, or if the source code is particularly sensitive to the user, the security action may include more aggressive actions such as deleting the hidden secret or performing other remediation actions. In other embodiments the system may elect not to perform a security action, for example, when the risk assessment is very low. Such risk assessment thresholds can be configured by the user or by a third party.

At step 595, process 500 may include outputting probability data to training a machine learning system to identify hidden secrets. Machine learning algorithms may be introduced into process 500 at various steps as disclosed in FIG. 5. For example, trained machine learning algorithms may be used to perform the preliminary analysis of source code at step 520 or may be used to determine the probability of hidden secrets in an element of source code at step 580. In some embodiments, process 500 is repeated multiple times to singularly or progressively train the machine learning algorithm to improve the accuracy in detecting hidden secret data. In other embodiments, selecting the security action may be based on the trained machine learning algorithm. For example, the machine learning algorithm may be trained to recognize bad practices in coding, such as use of the same secret in more than one place in code, and to change the code according to good coding policy.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for inspecting source code files for a presence of hidden secrets, comprising:
    accessing an element of source code of the source code files for analysis;
    performing a preliminary analysis of the element of source code, wherein the preliminary analysis includes an evaluation of an external resource associated with the source code files;
    performing a static analysis of the element of source code and the external resource, wherein the static analysis is prioritized based on the preliminary analysis of the external resource;
    generating, based on the static analysis, a control flow representation of the element of source code by mapping code logic of the element of source code, wherein the control flow representation identifies a plurality of functions and a sequence of the functions associated with the element of source code;
    determining, based on the control flow representation, a probability of a hidden secret being included in the element of source code;
    verifying, based on the control flow representation, that the hidden secret is a live variable used in the element of source code; and
    performing, based on the probability and the verification, a security action comprising at least one of:
        generating an alert,
        displaying a visual indication of the probability,
        generating a report associated with the hidden secret,
        sending data associated with the probability to a machine learning system for training the machine learning system, or
        a remediating action associated with the hidden secret.

2. The non-transitory computer-readable medium of claim 1,
    wherein the static analysis includes at least one of:
        identifying a communications protocol used by the element of source code,
        identifying a package used by the element of source code,
        identifying a file import associated with the element of source code, or
        identifying one or more headers of the element of source code as suspicious.

3. The non-transitory computer-readable medium of claim 1,
    wherein the probability of the hidden secret included in the element of source code is based on an identification of an encryption or encoding algorithm in the element of source code.

4. The non-transitory computer-readable medium of claim 1, wherein the probability of the hidden secret being included in the element of source code is specific to a particular location in the element of source code.

5. The non-transitory computer-readable medium of claim 1, wherein the control flow representation indicates a plurality of application programming interface calls according to the element of source code.

6. The non-transitory computer-readable medium of claim 1,
    wherein the remediating action includes at least one of: sending an identification of the hidden secret to an external platform, deleting the hidden secret, logging the hidden secret, or invalidating the hidden secret.

7. The non-transitory computer-readable medium of claim 1, wherein the remediating action includes at least a partial integration with a security platform that manages secrets.

8. The non-transitory computer-readable medium of claim 1, wherein the probability is based at least in part on an output of the machine learning system.

9. The non-transitory computer-readable medium of claim 1, wherein the security action is selected based at least in part on an output of the machine learning system.

10. The non-transitory computer-readable medium of claim 1, wherein the remediating action includes rotating the hidden secret to a new value.

11. A computer-implemented method for inspecting source code files for a presence of hidden secrets, comprising:
    accessing an element of source code of the source code files for analysis;
    performing a preliminary analysis of the element of source code, wherein the preliminary analysis includes an evaluation of an external resource associated with the source code files;
    performing a static analysis of the element of source code and the external resource, wherein the static analysis is prioritized based on the preliminary analysis of the external resource;
    generating, based on the static analysis, a control flow representation of the element of source code by mapping code logic of the element of source code, wherein the control flow representation identifies a plurality of functions and a sequence of the functions associated with the element of source code;

verifying, based on the control flow representation, that the hidden secret is a live variable used in the element of source code;

determining, based on the control flow representation, a probability of a hidden secret being included in the element of source code; and performing, based on the probability and the verification, a security action comprising at least one of:
  generating an alert,
  displaying a visual indication of the probability,
  generating a report associated with the hidden secret,
  sending data associated with the probability to a machine learning system for training the machine learning system, or
  a remediation action associated with the hidden secret.

12. The computer-implemented method of claim 11, wherein accessing the element of source code for analysis comprises receiving the element of source code from a code repository.

13. The computer-implemented method of claim 11, wherein the performing of the static analysis of the element of source code is prioritized based on the preliminary analysis of the element of source code.

14. The computer-implemented method of claim 13, wherein the preliminary analysis of the element of source code includes evaluation of nonexecutable program-readable language associated with the element of source code.

15. The computer-implemented method of claim 13, wherein the preliminary analysis of the element of source code includes identifying a likelihood that the element of source code uses one or more secrets.

16. The computer-implemented method of claim 11, further comprising generating a risk assessment for the element of source code.

17. The computer-implemented method of claim 16, wherein the risk assessment is based on the probability and at least one of:
  an application or platform associated with the element of source code,
  whether the hidden secret is single-factor or multi-factor,
  a type of the hidden secret, or
  a sensitivity of a target resource.

18. The computer-implemented method of claim 16, wherein the security action is selected based on the risk assessment.

19. The computer-implemented method of claim 13, wherein the preliminary analysis of the element of source code includes an evaluation of external files associated with the source code.

20. The computer-implemented method of claim 16, wherein the risk assessment is associated with a risk score.

* * * * *